(12) United States Patent
Lin et al.

(10) Patent No.: US 9,278,407 B2
(45) Date of Patent: Mar. 8, 2016

(54) DUAL-WIRE HYBRID WELDING SYSTEM AND METHOD OF WELDING

(75) Inventors: Dechao Lin, Greer, SC (US); Srikanth Chandrudu Kottilingam, Simpsonville, SC (US); Brian L. Tollison, Honea Path, SC (US); Yan Cui, Greer, SC (US); David Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 741 days.

(21) Appl. No.: 13/558,926

(22) Filed: Jul. 26, 2012

(65) Prior Publication Data

US 2014/0027413 A1  Jan. 30, 2014

(51) Int. Cl.
*B23K 26/00* (2014.01)
*B23K 9/28* (2006.01)
*B23K 26/14* (2014.01)

(52) U.S. Cl.
CPC ....... *B23K 26/1429* (2013.01); *B23K 2201/001* (2013.01)

(58) Field of Classification Search
CPC ................. B23K 26/1429; B23K 2201/001; B23K 28/02
USPC ......... 219/74, 121.53, 121.6, 121.63, 121.64, 219/137.2
See application file for complete search history.

(56) References Cited

U.S. PATENT DOCUMENTS

| | | | |
|---|---|---|---|
| 2010/0320174 A1* | 12/2010 | Hybinette et al. | 219/74 |
| 2011/0132878 A1 | 6/2011 | Wang et al. | |
| 2011/0198317 A1 | 8/2011 | Lin | |
| 2011/0215074 A1* | 9/2011 | Wang | B23K 9/091 219/121.64 |

OTHER PUBLICATIONS

Henderson, et al.; Nickel-Based Superalloy Welding Practices for Industrial Gas Turbine Applications, Science and Technology of Welding & Joining, vol. 9, Manning Publishing, Feb. 2004, pp. 13-21(9).

* cited by examiner

*Primary Examiner* — Dana Ross
*Assistant Examiner* — Lindsey C Teaters
(74) *Attorney, Agent, or Firm* — McNees Wallace & Nurick LLC

(57) ABSTRACT

A dual-wire hybrid welding system includes a hybrid welding apparatus having laser, electric arc welder and second wire feeding device. Electric arc welder includes first wire feeding device for feeding first wire. Second wire feeding device is arranged and disposed to feed a second wire to electric arc welder. Laser and electric arc welder are arranged and disposed to direct energy toward at least two adjacent components along a joint and first wire is a consumable electrode fed into joint to establish molten pool generated by both laser and arc welder with first wire. Second wire is fed to molten pool to form a common molten pool. Common molten pool is operable to provide a full penetration weld with less total heat input to join the at least two adjacent components without cracking the components at a high constant weld speed.

20 Claims, 4 Drawing Sheets

DUAL-WIRE HYBRID WELDING SYSTEM AND METHOD OF WELDING

FIELD OF THE INVENTION

This invention relates to joining technology generally, and specifically, to a dual-wire hybrid welding system and apparatus and a method for joining components subject to cracking when using laser welding and laser hybrid welding technology.

BACKGROUND OF THE INVENTION

Rene 108 superalloy is becoming a desired material of choice for buckets, nozzles, and shrouds in advanced gas turbines. Rene 108 has excellent mechanical and oxidation properties at elevated temperatures. However Rene 108 has poor weldability and is one of the hardest to weld materials in the superalloy category. Welding on Rene 108 using any traditional arc welding procedures results in a significant cracking in the weld metal and base metal heat affected zone.

Laser welding or laser hybrid welding of Rene 108 generates undesirable cracks along the weld line. Generally, the cracks produced from laser welding are perpendicular to the welding joint. Undesirable cracks along the weld line lead to unacceptable welds.

Therefore, a welding system and apparatus and a method of welding that do not suffer from the above drawbacks are desirable in the art.

SUMMARY OF THE INVENTION

According to an exemplary embodiment of the present disclosure, a dual-wire hybrid welding system is provided. The dual-wire hybrid welding system includes a hybrid welding apparatus and a second wire feeding device for feeding a second wire. The hybrid welding apparatus includes a laser and an electric arc welder having a first wire feeding device for feeding a first wire. The second wire feeding device is arranged and disposed to feed the second wire from the electric arc welder side. The laser and the electric arc welder are arranged and disposed to direct energy toward at least two adjacent components along a joint. The first wire is a consumable electrode and is fed into the joint to establish a molten pool generated by both laser and arc welder with the first wire. The second wire is fed to the molten pool to form a common molten pool. The common molten pool is operable to provide a full penetration weld to join the at least two adjacent components without cracking the components at a high constant weld speed.

According to another exemplary embodiment of the present disclosure a method of welding at least two adjacent components is provided. The method includes providing a dual-wire hybrid welding system, the dual-wire hybrid welding system including a hybrid welding apparatus and a second wire feeding device. The hybrid welding apparatus includes a laser and an electric arc welder having a first wire feeding device for feeding a first wire. The second wire feeding device is arranged and disposed to feed a second wire to an arc area of the electric arc welder. The method includes directing energy toward one or both of the adjacent components with the hybrid welding apparatus while feeding the first wire to form a molten pool. The method includes feeding the second wire into the molten pool generated by the hybrid welding apparatus to form a common molten pool. The common molten pool is operable to provide a full penetration weld to join the at least two adjacent components without cracking the components at a high constant weld speed.

Other features and advantages of the present disclosure will be apparent from the following more detailed description of the preferred embodiments, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION OF THE INVENTION

Provided is a dual-wire hybrid welding system, apparatus and a method of welding that do not suffer from the drawbacks in the prior art and provides a reduced overall heat input at high welding speeds. One advantage of an embodiment of the present disclosure includes obtaining fully penetrated crack-free welds and weld repairs in superalloys such as Rene 108 material. Another advantage is the use of minimal heat input, thereby reducing the tendency of crack formation in crack prone superalloys like Rene 108 during welding and weld repair. Yet another advantage is higher welding speeds and lower overall heat input for welding crack prone superalloy materials like Rene 108.

Figure 1:
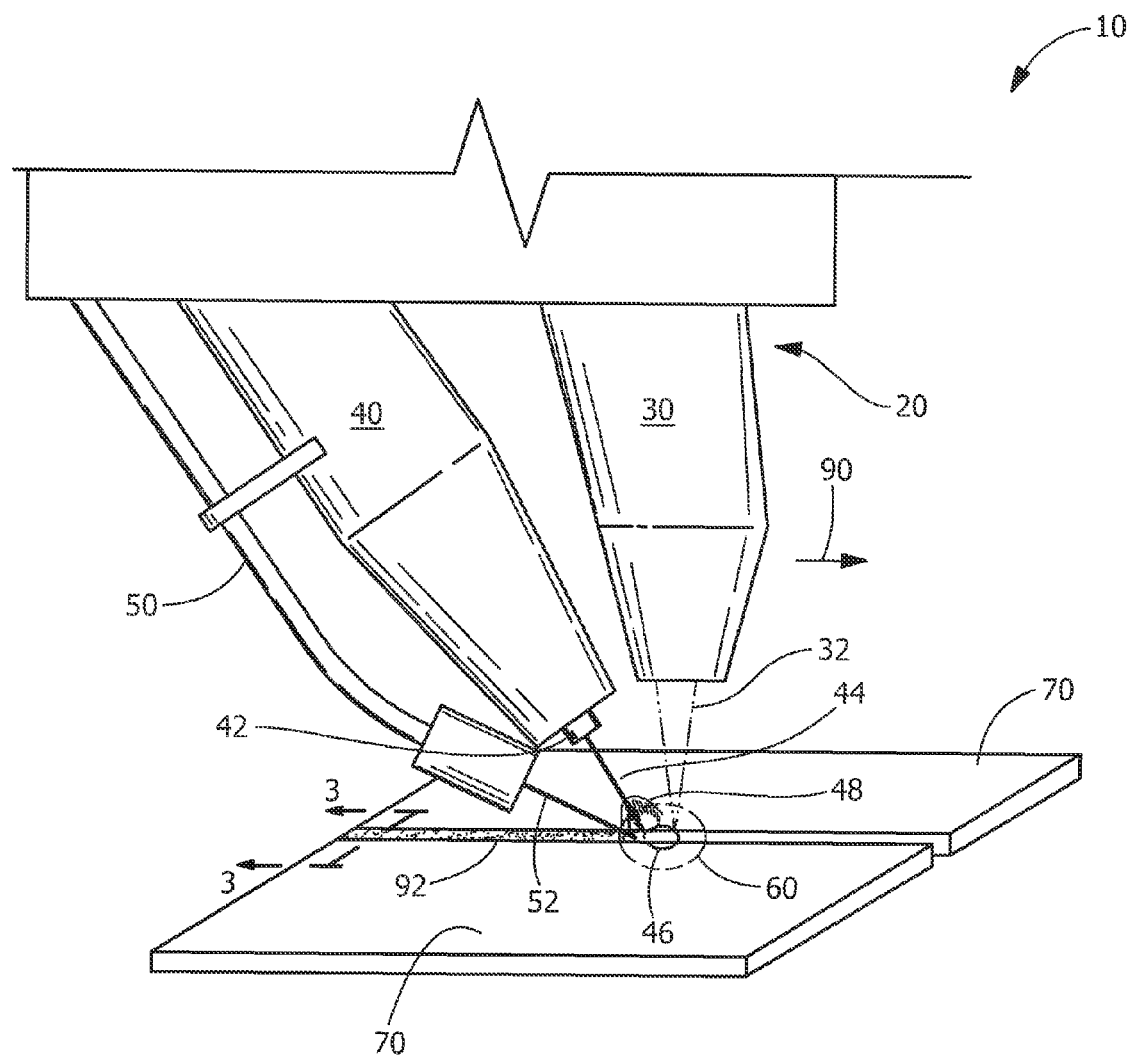
FIG. 1 is a perspective view of a schematic representation of the dual-wire hybrid welding system and apparatus of the present disclosure.

FIG. 1 schematically illustrates a dual-wire hybrid welding system 10 including a hybrid laser welding apparatus 20 of the present disclosure and second wire feeding device 50. Hybrid welding apparatus 20 includes a laser 30 and an electric arc welder 40 having a first wire feeding device 42 for feeding a first wire 44. Dual-wire hybrid welding system 10 includes a second wire feeding device 50 for feeding a second wire 52. Second wire feeding device 50 is arranged and disposed to feed the second wire 52 to an arc area 46 of electric arc welder 40. Laser 30 and electric arc welder 40 with the first wire 44 are arranged and disposed to direct energy toward at least two adjacent components 70 to form a molten pool. The second wire 52 is fed into the molten pool and forms a common molten pool 60. Common molten pool 60 includes a molten pool established by laser 30 and electric arc welder 40, and the molten metals from second wire 52. Common molten pool 60 is operable to provide a full penetration weld 92 to join at least two adjacent components 70 without cracking the weld and components 70 at a high constant weld speed.

Feeding second wire 52 into molten pool without creating additional arc between second wire 52 and component 70 requires a reduction in heat input during welding. The reduction in heat can be achieved by reducing the wire feeding speed in electric arc welder 40, which reduces arc area 46. Second wire 52 is added to compensate for the amount of first metals needed in the weld formation.

In one embodiment, laser 30 is selected from a Nd: YAG laser, a $CO_2$ laser, a fiber laser, and a disk laser. Electric arc welder 40 is selected from welders including consumable electrodes, such as, but not limited to, a gas metal arc welder (GMAW), a flux cored arc welder (FCAW) and welders having non-consumable electrodes with wire feeding, such as, but not limited to, a gas tungsten arc welder (GTAW) with wire feeding and a plasma arc welder (PAW) with wire feeding.

Components 70 include any materials that are joinable or weldable, but generally include materials, such as, but not limited to, aluminum, titanium, steel, stainless steel, brass, copper, nickel, beryllium-copper, superalloy, alloys thereof and combinations thereof. Dual-wire hybrid welding system 10 is especially suitable for use with crack prone superalloys, such as high contents of aluminum plus titanium nickel-based superalloys, for example Rene 108, having a nominal composition, in weight percent, of about 0.07-0.10 percent carbon, about 8.0-8.7 percent chromium, about 9.0-10.0 percent cobalt, about 0.4-0.6 percent molybdenum, about 9.3-9.7 percent tungsten, about 2.5-3.3 percent tantalum, about 0.6-0.9 percent titanium, about 5.25-5.75 percent aluminum, about 0.01-0.02 percent boron, about 1.3-1.7 percent hafnium, about 0.1 percent maximum manganese, about 0.06 percent maximum silicon, about 0.01 percent maximum phosphorus, about 0.004 percent maximum sulfur, about 0.005-0.02 percent zirconium, about 0.1 percent maximum niobium, about 0.1 percent maximum vanadium, about 0.1 percent maximum copper, about 0.2 percent maximum iron, about 0.003 percent maximum magnesium, about 0.002 percent maximum oxygen, about 0.002 percent maximum nitrogen, balance nickel and incidental impurities.

Figure 2:
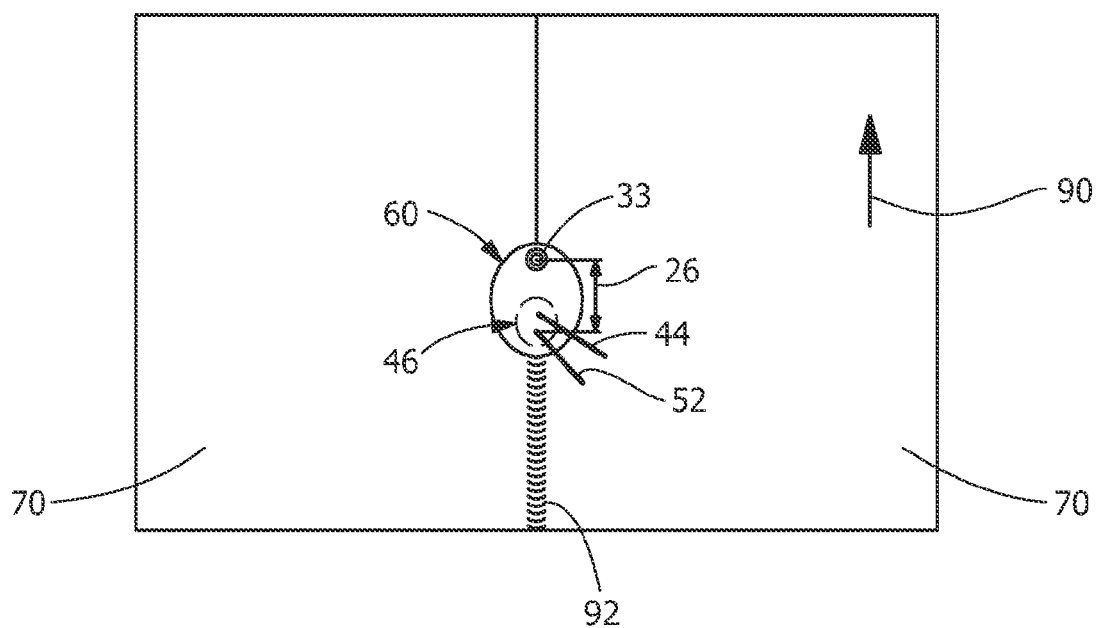
FIG. 2 is a schematic top view of FIG. 1 with the dual-wire hybrid welding apparatus removed.

In FIG. 2, hybrid laser welding apparatus 20 has been removed to show common molten pool 60, arc area 46, and laser area 33. The combined energy from beam 32 of laser 30 and electric arc welder 40 are directed toward aligned components 70 to create a molten pool. Second wire 52 is delivered and melted in the molten pool to form common molten pool 60. Common molten pool 60 operates to provide a full penetration weld 92 to join components 70 at a high constant weld speed. As used "common molten pool" 60 refers to the molten material created by the weld arc 48 (see FIG. 1) of electric arc welder 40 that includes a portion of the component 70 edges and first wire 44, second wire 52, and the molten material that was energized by beam 32 of laser 30 thereby causing the molten material to penetrate deeper into components 70. In one embodiment, first wire 44 and second wire 52 are within arc area 46 created by electric arc welder 40. Arc area 46 is the projection zone around the electric arc 48 from electric welder 40 that provides additional energy or heat to surface of components 70. Generally, any materials within arc area 46 are energized or melted. Arc area 46 aids in melting first wire 44 and second wire 52 and adds additional energy by laser beam 36 to form common molten pool 60. First wire 44 and second wire 52 become molten from arc area 46 and are intermixed with the other molten materials generated from laser to form a common molten pool 60 in weld direction 90. The intermixed molten materials from common molten pool 60 join upon cooling to form one continuous piece or a full penetration weld 92 (see FIG. 5) joining components 70.

In one embodiment, first wire 44 is a cold wire or a hot wire. In one embodiment, second wire 52 is a cold wire or hot wire. Any suitable materials can be used for first wire 44 or second wire 52, depending on desired weld characteristics such as weld strength, weld chemistry, and weld hardness. In one embodiment, first wire 44 and second wire 52 are selected from the same material, in an alternative embodiment, first wire 44 and second wire 52 are selected from different materials. Suitable examples of materials for first wire 44 and second wire 52 include, but are not limited to, aluminum, iron, cobalt, copper, nickel, stainless steel, carbon steel, superalloy, titanium, gold, silver, palladium, platinum, alloys thereof, and combinations thereof.

In one embodiment, laser 30 leads electric arc welder 40 in weld direction 90. As shown in FIG. 2, distance 26 between laser beam 32 and arc area 46 is between about 1.0 millimeters to about 12 millimeters, or alternatively between about 3.0 millimeters to about 8.0 millimeters, or alternatively between about 3.5 millimeters to about 6.0 millimeters to obtain adequate interaction of the two heat sources to create a stable molten pool. In another embodiment, laser 30 trails electric arc welder 40 in weld direction 90.

In one embodiment, to reduce the total heat input, electric arc welder 40 power is decreased while keeping the laser power unchanged to allow for deep penetration. Electric arc welder 40 power can be reduced by decreasing first wire 44 feeding speed. To compensate for the reduced amount of material available to form weld bead 92, second wire 52 is delivered to the molten pool with second wire feeding device 50 to provide additional material for common molten pool 60 to form weld bead 92. Total heat input from electric arc welder 40 and entire heat input to complete weld is reduced. Lower heat input prevents formation of cracks along weld line and in material during joining of components 70 (see FIG. 3).

Figure 3:
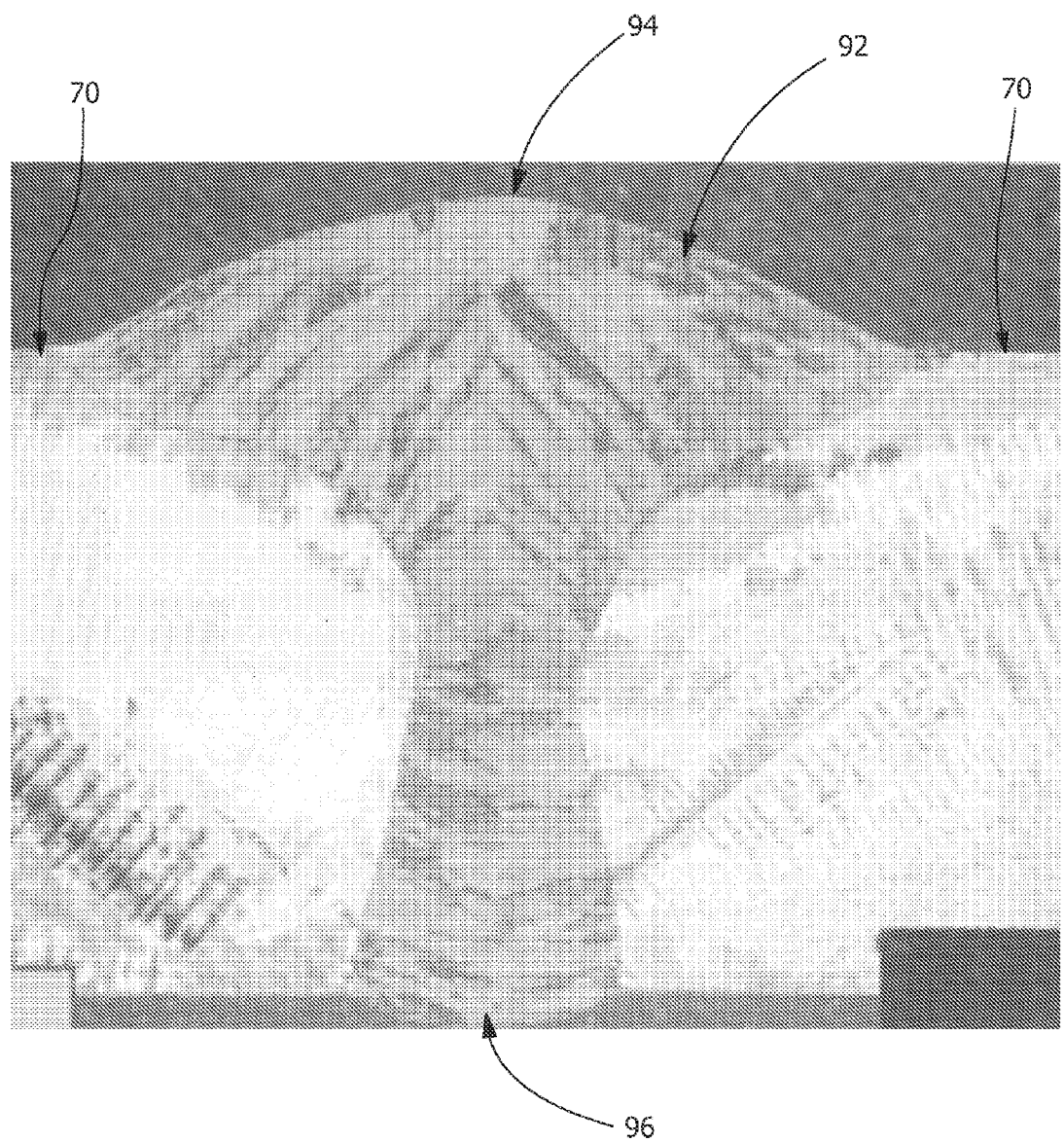
FIG. 3 is a cross-sectional view taken in direction 3-3 of FIG. 1 of a full penetration weld created by the dual-wire hybrid welding system and apparatus of the present disclosure.
Figure 4:
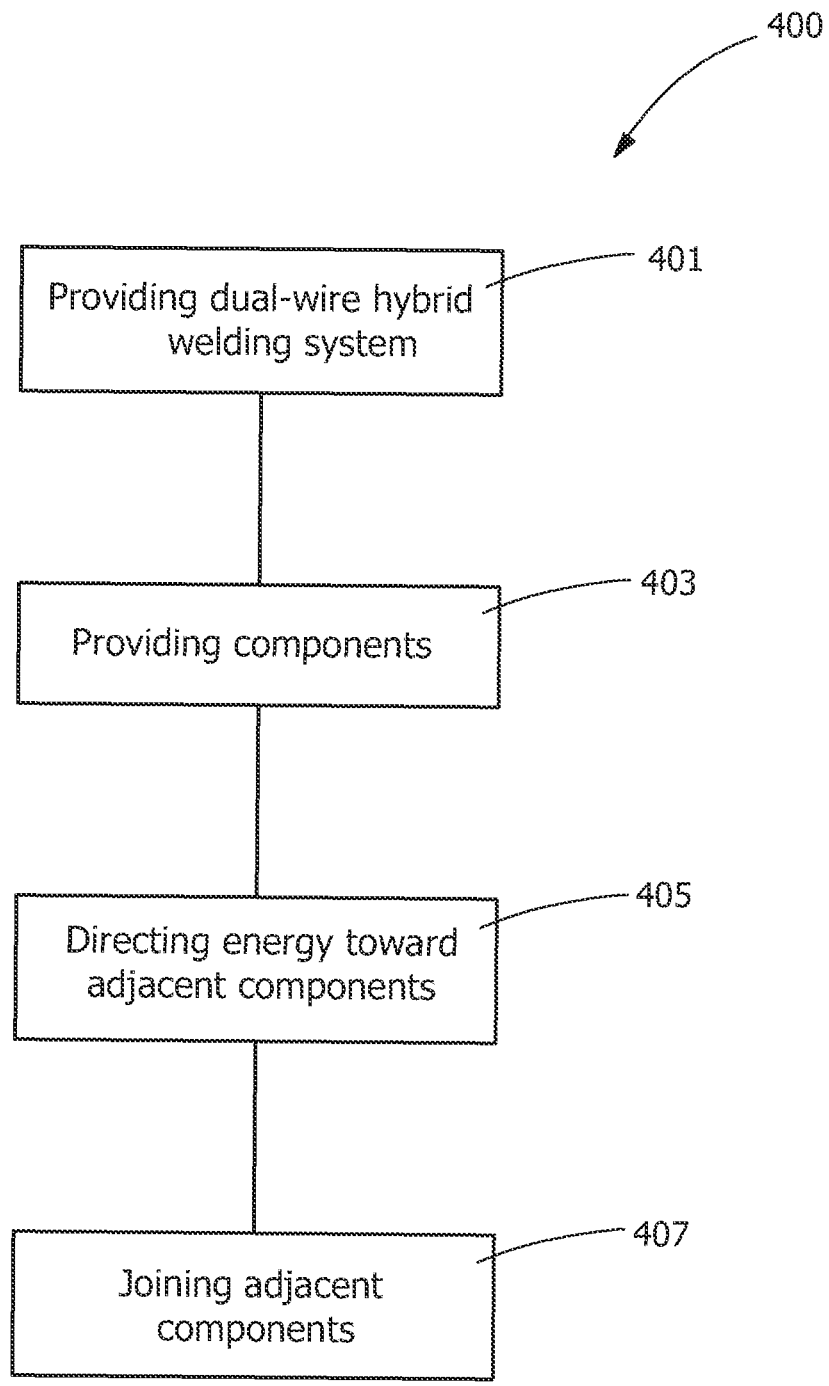
FIG. 4 is a flow chart of the method welding at least two adjacent components of the present disclosure.

As shown in the flowchart of FIG. 4, method 400 of welding at least two adjacent components 70 using dual-wire hybrid welding system 10 is provided. Method 400 includes providing dual-wire hybrid welding system 10, step 401. Dual-wire hybrid welding system 10 includes hybrid welding apparatus 20 and second wire feeding device 50. Hybrid welding apparatus 20 includes laser 30 and electric arc welder 40 including first wire feeding device 42 for feeding first wire 44 (see FIGS. 1 and 2). Second wire feeding device 50 is adjacent hybrid welding apparatus 20 and feeds second wire 52 (see FIGS. 1 and 2). Second wire feeding device 50 is arranged and disposed to feed second wire 52 to arc area 46 of electric arc welder 40 (see FIG. 2). Method 400 includes providing components 70, step 403 (see FIG. 1). Method 400 includes directing energy from hybrid laser welding apparatus 20 to components 70 (see FIG. 2), step 405. Directing energy, step 405, includes feeding first wire 44 and second wire 52, and the laser energy, to form common molten pool 60 operable to provide full penetration weld 92. Method 400 includes joining adjacent components 70 without cracking at high constant weld speed (see FIG. 3), step 407. High constant weld speed is approximately 762 millimeters (30 inches) per minute to approximately 3050 millimeters (120 inches) per minute or approximately 1524 millimeters (60 inches) per minute to approximately 3050 millimeters (120 inches) per minute.

EXAMPLES

Reference Example

Reference Example using a conventional hybrid welding apparatus 20 without second wire: Two Rene 108 components, having a thickness of 4.7625 millimeters (3/16 inch) were joined using a single weld bead obtained from a hybrid welder apparatus including a laser and GMAW welder using a welding filler metal of Nimonic 263 having a diameter of 0.9 millimeters (0.035 inches). The laser power was set at 3.6 kW. The GMAW had the following settings: wire feeding speed of 400 inch per minute (ipm), voltage of 25.4 Volts (V), and average 113 Amps (A) under the pulse mode for a total average arc power of 2.87 kW. The welding speed used to make the single weld bead was 60 ipm. The single weld bead was measured using a stereoscope. The resulting weld had unacceptable cracks along the weld line. The total heat input for the reference example is 6.47 kJ/in.

Example 1

Example 1: Components were joined using dual-wire hybrid welding system 10, including second wire feeding device 50 and hybrid laser welding apparatus 20 of the present disclosure. Two Rene 108 components, having a thickness of 4.7625 millimeters (3/16 inches) were joined using a single weld bead obtained by using dual-wire hybrid welder system 10, including a laser and GMAW having a first wire feeding device 42 and first wire 44 and a second wire feeding device 50, and second wire 52. First wire 44 of Nimonic 263 had a diameter of about 0.9 millimeters (0.035 inches). Second wire 52 of Nimonic 263 had a diameter of approximately 0.9 millimeters (0.035 inches) was delivered into arc area 46 (see FIG. 2) using second wire feeding device 50 at a feeding rate of approximately 50 inches per minute. The laser was set at 3.6 kW. The GMAW had the following settings: wire feeding speed of 350 inch per minute (ipm), 50 ipm, average voltage of 21 Volts (V), and average 113 Amps (A) under the pulse mode for a total arc power of 2.34 kW. The welding speed used to make the weld bead was 60 ipm. The resulting weld 92 did not have any cracks along the weld line at both as-welded conditions and two hours after welding after heat treatment at 2050° F. (see FIG. 3). The total heat input for Example 1 is 5.94 kJ/in. The total heat input using dual-wire hybrid welding system 10 of the present disclosure results in an 8% reduction in total heat from the reference example and a weld free from cracks. FIG. 3 is a cross-section of the full penetration weld 92 obtained using dual-wire hybrid welding system 10 of the present disclosure. The weld 92 includes a top bead 94 and under bead 96 free from cracks along weld line.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A dual-wire hybrid welding system comprising:
a hybrid welding apparatus, the hybrid welding apparatus having a laser and an electric arc welder having a first wire feeding device for feeding a first wire; and
a second wire feeding device for feeding a second wire, the second wire feeding device being arranged and disposed to feed the second wire from the electric arc welder side with respect to a weld direction;
wherein the laser and the electric arc welder are arranged and disposed to direct energy toward at least two adjacent components along a joint along the weld direction and the first wire being a consumable electrode fed into the joint after the laser along the weld direction to establish a molten pool generated by both the laser and the electric arc welder with the first wire, the electric arc welder and the first wire also forming an arc area, the laser also forming a laser area, and wherein the second wire is fed to the arc area of the molten pool after the first wire along the weld direction to form a common molten pool, the common molten pool including the laser area and the arc area and being operable to provide a full penetration weld to join the at least two adjacent components without cracking the components at a high constant weld speed, the second wire being fed at a rate to reduce heat input into the at least two adjacent components during welding without creating additional arc between the second wire and the at least two adjacent components;
wherein the arc area is located a first distance away from the laser area.

2. The dual-wire hybrid welding system of claim 1, wherein the laser is selected from the group consisting of a Nd: YAG laser, a $CO_2$ laser, a fiber laser, and a disk laser.

3. The dual-wire hybrid welding system of claim 1, wherein the electric arc welder is selected from the group consisting of a gas tungsten arc welder with wire feeding, a gas metal arc welder, a flux cored arc welder, and a plasma arc welder with wire feeding.

4. The dual-wire hybrid welding system of claim 1, wherein the second wire from the second wire feeding device is adjacent to a heating zone.

5. The dual-wire hybrid welding system of claim 1, wherein the second wire feeding device for feeding a second wire is adjacent to the electric arc welder.

6. The dual-wire hybrid welding system of claim 1, wherein the second wire feeding device for feeding a second wire is adjacent to the laser.

7. The dual-wire hybrid welding system of claim 1, wherein the first wire is cold wire or hot wire.

8. The dual-wire hybrid welding system of claim 1, wherein the second wire is cold wire or hot wire.

9. The dual-wire hybrid welding system of claim 1, wherein the at least two adjacent components to be welded include materials selected from the group consisting of titanium, nickel, iron, cobalt, chromium, superalloys thereof, alloys thereof, and combinations thereof.

10. The dual-wire hybrid welding system of claim 1, wherein the first distance is in a range of 1-12 mm.

11. The dual-wire hybrid welding system of claim 1, wherein the first distance is in a range of 3-8 mm.

12. A method of welding at least two adjacent components comprising:
providing a dual-wire hybrid welding system, the dual-wire hybrid welding system including a hybrid welding apparatus and a second wire feeding device arranged along a weld direction, the hybrid welding apparatus having a laser and an electric arc welder having a first wire feeding device for feeding a first wire, the second wire feeding device being arranged and disposed to feed a second wire to an arc area formed by the electric arc welder and the first wire; and
directing energy toward one or both of the adjacent components with the hybrid welding apparatus along the weld direction while feeding the first wire to form a molten pool after the laser along the weld direction, the laser forming a laser area,
feeding the second wire into the arc area of the molten pool generated by the hybrid welding apparatus after the first wire along the weld direction to form a common molten pool including the laser area and the arc area, wherein the common molten pool being operable to provide a full penetration weld to join the at least two adjacent components without cracking the components at a high constant weld speed, the second wire being fed at a rate to reduce heat input into the at least two adjacent components during welding without creating additional arc between the second wire and the at least two adjacent components;

wherein the arc area is located a first distance away from the laser area.

13. The method of claim 12, wherein the laser is a high-power density laser beam selected from the group consisting of a Nd:YAG laser, a $CO_2$ laser, a fiber laser, and a disk laser.

14. The method of claim 12, wherein the electric arc welder is selected from the group consisting of a gas tungsten arc welder with wire feeding, a gas metal arc welder, a flux cored arc welder, and a plasma arc welder with wire feeding.

15. The method of claim 12, wherein the electric arc welder is operated at a reduced energy level.

16. The method of claim 12, wherein the second wire feeding device is adjacent to the laser.

17. The method of claim 12, wherein the second wire feeding device is adjacent to the electric arc welder.

18. The method of claim 12, wherein the high constant weld speed is approximately 1524 millimeters per minute to approximately 3050 millimeters per minute.

19. The method of claim 12, wherein the first distance is in a range of 1-12 mm.

20. The method of claim 12, wherein the first distance is in a range of 3-8 mm.

* * * * *